United States Patent [19]

Abe et al.

[11] Patent Number: 4,539,260
[45] Date of Patent: Sep. 3, 1985

[54] MAGNETIC RECORDING MATERIAL

[75] Inventors: Koichi Abe, Kyoto; Kenichi Kawakami; Toshiya Yoshii, both of Ohtsu; Toshihide Inoue, Ichinomiya, all of Japan

[73] Assignee: Toray Industries, Inc., Tokyo, Japan

[21] Appl. No.: 526,773

[22] Filed: Aug. 26, 1983

[30] Foreign Application Priority Data

Aug. 26, 1982 [JP] Japan .................. 57-148102
Aug. 26, 1982 [JP] Japan .................. 57-148103
Oct. 22, 1982 [JP] Japan .................. 57-184744

[51] Int. Cl.³ .............................. B32B 5/00
[52] U.S. Cl. .................. 428/336; 428/337; 428/480; 428/694; 428/900
[58] Field of Search ........... 528/209; 428/697, 694, 428/480, 212, 900, 336, 337

[56] References Cited

U.S. PATENT DOCUMENTS

| 3,700,540 | 10/1972 | Buteux | 528/209 |
| 3,705,130 | 7/1973 | Komatsu et al. | 528/209 |
| 3,873,504 | 3/1975 | Boettcher et al. | 528/209 |
| 3,901,851 | 8/1975 | Kohno et al. | 528/209 |
| 4,112,187 | 9/1978 | Asakura et al. | 428/694 |

FOREIGN PATENT DOCUMENTS 49-1795  1/1974  Japan .
49-52292 5/1974  Japan .

Primary Examiner—George F. Lesmes
Assistant Examiner—William M. Atkinson
Attorney, Agent, or Firm—Armstrong, Nikaido, Marmelstein & Kubovcik

[57] ABSTRACT

A magnetic recording material which comprises a film of a polyester and a magnetic layer formed on at least one side of said film, said polyester containing more than 85 mol % of the repeating unit represented by the formula below and having an intrinsic viscosity of 0.3 to 1.4, and said film of said polyester having a refractive index ratio of 0.935 to 0.975 in the thickness direction and a density index of 0.02 to 0.08.

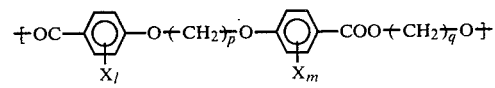

(where X is a halogen atom selected from fluorine, chlorine, and bromine, or an alkyl group of carbon number 1 to 3; and l and m are an integer of 1 to 2, p is an integer of 2 to 6, and q is an integer of 2 to 4.)

Although the magnetic recording material is extremely thin, it exhibits outstanding running performance and electromagnetic conversion characteristics. It makes it possible to miniaturize the magnetic tape cassette and extend the recording time. It is useful for long-time video tape and portable 8-mm video tape.

18 Claims, No Drawings

MAGNETIC RECORDING MATERIAL

BACKGROUND

The present invention relates to a magnetic recording material. More particularly, the invention relates to a magnetic tape having improved running performance and electromagnetic conversion characteristics even when it is made thin.

Heretofore, the common magnetic recording material has been a magnetic tape made of biaxially oriented polyethylene terephthalate film as the base film. Such a magnetic tape, however, has a disadvantage that it becomes poor in running performance and electromagnetic characteristics when the tape cassette is miniaturized or the base film is made thin to extend the recording time. On the other hand, the magnetic tape (as disclosed in U.S. Pat. Nos. 3,177,277 and 4,226,826) made of reinforced polyethylene terephthalate film as the base film has also a disadvantage that it is poor in running performance and electromagnetic conversion characteristics when the base film is thinner than 9 μm it is used as video tape. In other words, magnetic tape made of polyethylene terephthalate film as the base film cannot meet the requirement for miniaturizing the tape cassette and thinning the tape for extended recording time.

Other polyesters than polyethylene terephthalate include polyethylene bis(phenoxy)ethane-4,4'-dicarboxylate (another name: polyethylene-1,2-diphenoxyethane-4,4'-dicarboxylate) as disclosed in British Pat. No. 1171685. According to this British patent, the polyester is capable of melt film forming and biaxial orientation and can be formed into film of high strength. However, this film is not satisfactory in running performance and electromagnetic conversion characteristics as the base film of the magnetic tape.

Japanese Patent Publication No. 49-1795 discloses another polyester, [polyalkylene-α,β-bis(2-chlorophenoxy]ethane-4,4'-dicarboxylate). In this patent, this polyester is described to be melt formable into fibre and film. And the fiber actually made from this polyester in examples is reported to have a high Young's modulus. However, this patent only suggests that this polyester might be melt formed to a film but no such film is mentioned in the examples of this patent.

The present inventors prepared base films having different properties from many polyesters including the above mentioned two, and investigated the running performance and electromagnetic characteristics of magnetic tapes made from the base films. As the result, it was found that magnetic tapes made from the base film which is made of a specific polyester and satisfies the specific parameters is specifically superior in running performance and electromagnetic conversion characteristics even when the base film is thin. The present inventors completed this invention based on these findings.

SUMMARY

Accordingly, it is an object of this invention to provide a magnetic recording material which is superior in running performance and electromagnetic conversion characteristics even when it is made thin.

It is another object of this invention to provide a magnetic tape which permits the magnetic tape cassette to be miniaturized and the recording time to be extended.

These objects of this invention are achieved by a magnetic tape which comprises a film of a polyester and a magnetic layer formed on at least one side of said film, said polyester containing more than 85 mol % of the main repeating unit represented by the formula below and having an intrinsic viscosity of 0.3 to 1.4, and said film of said polyester having a refractive index ratio of 0.935 to 0.975 in the thickness direction and a density index of 0.02 to 0.08.

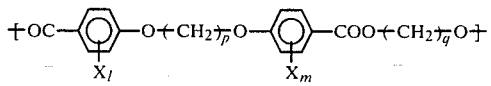

(where X is a halogen atom selected from fluorine, chlorine, and bromine, or an alkyl group of carbon number 1 to 3; and l and m are an integer of 1 to 2; p is an integer of 2 to 6, and q is an integer of 2 to 4.)

PREFERRED EMBODIMENTS

The polyester which constitutes the base film for the magnetic recording material of this invention contains more than 85 mol % preferably 90 mol %, more preferably 95 mol % of the repeating unit represented by the following formula (A). The magnetic tape made from the base film of polyester containing less than 85 mol % of the repeating unit is poor in running performance and electromagnetic conversion characteristics.

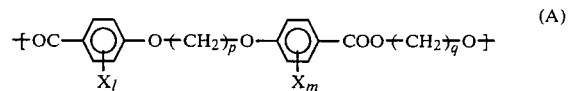

(A)

where X is a halogen atom selected from fluorine, chlorine, and bromine, or an alkyl group of carbon number 1 to 3. X is preferably chlorine and bromine, and more preferably chlorine. The position of X on the aromatic ring is not specifically limited; but it preferably be at the ortho position with respect to the adjacent oxygen atom.

Each of the subscripts l and m is an integer of 1 to 2; but preferably both are 1. The subscript p is an integer of 2 to 6 and the subscript q is an integer of 2 to 4; but preferably both p and q are 2. Thus, the preferred magnetic tape having improved running performance and electromagnetic conversion characteristics is obtained when the main repeating unit comprises ethylene-α,β-bis(2-chlorophenoxy)ethane-4,4'-dicarboxylate.

The polyester constituting the magnetic tape of this invention may contain other copolymer components in an amount up to 15 mol %. Examples of such copolymer components include dicarboxylic acids such as terephthalic acid, isophthalic acid, naphthalene dicarboxylic acid, 4,4'-biphenyldicarboxylic acid, α,β-bis(phenoxy)ethane-4,4'-dicarboxylic acid and α-2-chlorophenoxy-β-phenoxy-ethane-4,4'-dicarboxylic acid; and dioxy compounds such as 1,4-cyclohexane dimethanol. The polyester used in this invention may be incorporated with other polymers in such an amount that the object of this invention is not prevented. Moreover, the polyester may be incorporated with inorganic or organic additives such as anti-oxidant heat stabilizer, surface roughening agent, nucleating agent, and UV absorber in an ordinary quantity.

The base film of the magnetic recording material of this invention is a biaxially oriented film of the above-mentioned polyester. It has a refractive index ratio of 0.935 to 0.975, and preferably 0.940 to 0.970 in the direction of film thickness. The magnetic tape made from the base film having a refractive index ratio smaller than the specified limit is poor in running performance, and it will break immediately after the start of running or squeals during running. Conversely, if the refractive index ratio is greater than the specified limit, the edge of the magnetic tape will be turned over or curled while the tape is running. Such a magnetic tape is poor in running performance and electromagnetic conversion characteristics. Magnetic tape superior in running performance and in electromagnetic conversion characteristics can be obtained when the base film produced from polyethylene-$\alpha,\beta$-bis(2-chlorophenoxy)ethane-4,4'-dicarboxylate has a refractive index of 1.520 to 1.565, preferably 1.530 to 1.560, in the direction of film thickness.

The base film constituting the magnetic recording material of this invention preferably have a density index of 0.02 to 0.08, preferably 0.02 to 0.05 and more preferably 0.03 to 0.05. If the density index of the base film is lower than the above specified limit, the resulting magnetic tape is poor in electromagnetic conversion characteristics. Conversely, if the density index of the base film is higher than the above specified limit, the resulting magnetic tape is poor in running performance. Magnetic tape superior in running performance and electromagnetic conversion characteristics can be obtained when the base film is formed from a polyester comprising the main repeating unit of ethylene-$\alpha,\beta$-bis(2-chlorophenoxy)ethane-4,4'-dicarboxylate which has a density of 1.45 to 1.49, preferably 1.46 to 1.48.

According to this invention, the polyester which is made into the base film have an intrinsic viscosity of 0.3 to 1.4, preferably 0.3 to 1.0, more preferably 0.4 to 1.0. In the case of a polyester having an intrinsic viscosity lower than the above-specified limit, the magnetic tape made from it is poor in running performance. Conversely, in the case of a polyester having an intrinsic viscosity higher than the above-specified limit, the magnetic tape made from it is poor in electromagnetic conversion characteristics.

The base film from which the magnetic recording material of this invention is made is not specifically limited with respect to Young's modulus and heat shrinkage. However, the base film preferably have a Young's modulus of 550 to 2000 kg/mm$^2$, more suitably 600 to 1800 kg/mm$^2$, in at least one direction, and a heat shrinkage of 0 to 4%, more preferably 0 to 3% at 150° C. in the direction for measuring Young's modulus.

The base film for the magnetic recording material of this invention is not specifically limited with respect to refractive index and Young's modulus in the longitudinal direction and width direction. However, in order for the magnetic tape to have improved running performance and electromagnetic conversion characteristics, the base film preferably have such a refractive index that the sum of the values measured in the longitudinal direction and width direction is 3.305 to 3.420, preferably 3.315 to 3.410, and the difference of the values measured in the two directions (value in longitudinal direction minus value in width direction) is $-0.15$ to 0.15, preferably $-0.10$ to 0.10. Also, the base film preferably have such a Young's modulus that the sum of the values measured in the longitudinal direction and width direction is 1500 to 2800 kg/mm$^2$, preferably 1700 to 2600 kg/mm$^2$.

The base film for the magnetic recording material of this invention is not specifically limited with respect to thickness. However, the base film preferably have a thickness of 2 to 12 $\mu$m, more preferably 3 to 8 $\mu$m. The base film having such a thickness is also preferable for running performance and electromagnetic conversion characteristics of the magnetic tape and for miniaturization of the magnetic tape cassette and extention of the recording time.

The magnetic layer formed on the magnetic recording material of this invention is not specifically limited; but it may be formed from any known magnetic material. A ferromagnetic metal layer of thin film type containing substantially no organic polymer is preferred. The ferromagnetic material is not specifically limited; but it should preferably be $\gamma$-Fe$_2$O$_3$, Fe$_3$O$_4$, CrO$_2$, Co-doped iron oxide, Co, Ni, Fe, Mn, or an alloy containing at least one member selected therefrom.

The magnetic layer is not specifically limited with respect to thickness; but it may preferably be 0.05 to 5 $\mu$m, more suitably 0.05 to 1 $\mu$m.

In what follows is given the description of the process for producing the magnetic recording material of this invention.

At first, the pellets of the polyester which meets the requirements of this invention are thoroughly dried under reduced pressure. The pellets are then fed to a known melt extruder and extruded from a slit die into an unoriented film. This unoriented film preferably have a density index of 0 to 0.03, more suitably 0 to 0.02, so that the film is uniform in thickness and is capable of satisfactory biaxial orientation. The unoriented film is then biaxially oriented by simultaneous biaxial orientation or successive biaxial orientation. In the case of successive biaxial orientation, usually stretching is carried out in the long direction at first and in the width direction next. But this order of orientation may be reversed. The biaxial orientation usually will be carried out under different conditions depending on the type and viscosity of polyester and the method of orientation employed. The temperature for orientation is higher than the glass transition temperature of the polymer and lower than the cold crystallization temperature. The rate of orientation may be 10$^3$ to 10$^6$ %/min. In order to give the base film a preferred refractive index ratio in the thickness direction, the draw ratio can be determined so that the ratio $\alpha$ in the long direction and the ratio $\beta$ in the width direction satisfy the formula (B), preferably formula (C) below. If a base film having a Young's modulus of 550 to 900 kg/mm$^2$ in at least one direction is to be produced, $\alpha^2+\beta^2$ may be greater than 18.0.

$$12.5 \leq \alpha^2+\beta^2 \leq 55.0 \tag{B}$$

$$18.0 \leq \alpha^2+\beta^2 \leq 40.0 \tag{C}$$

The two-stage orientation in which the biaxial orientation is followed by orientation in at least one direction, is effective in producing a base film having a Young's modulus of 900 to 2000 kg/m$^2$ in at least one direction and having a heat shrinkage of 0 to 4% at 150° C. in the direction for measuring Young's modulus. It is also effective in producing a base film having such refractive indexes that the sum of the values in the long direction and width direction is 3.305 to 3.420 and the difference of those values (long direction minus width direction) is −0.15 to 0.15, and having such Young's moduli that the sum of the values in the long direction and width direction is 1500 to 2800 kg/mm². The second orientation is carried out under different conditions depending on the type and viscosity of polyester and the method of orientation employed. The temperature for orientation is higher than the glass transition temperature of the polymer and lower than the temperature of melting point minus 70° C. The rate of orientation is $10^3$ to $10^6$ %/min. The draw ratio in the first orientation is such that the ratio α in the long direction and the ratio β in the width direction satisfy the formula (D), preferably formula (E) below.

$$10.0 \leq \alpha^2 + \beta^2 \leq 40.0 \tag{D}$$

$$12.5 \leq \alpha^2 + \beta^2 \leq 30.0 \tag{E}$$

The draw ratio in the second orientation is such that the ratio γ in the long direction and the ratio δ in the width direction satisfy the formula (F), preferably formula (G) below.

$$2.2 \leq \gamma^2 + \delta^2 \leq 15.0 \tag{F}$$

$$2.5 \leq \gamma^2 + \delta^2 \leq 8.5 \tag{G}$$

(where $\gamma \geq 1$ and $\delta \geq 1$)

Subsequently, the oriented film is subjected to heat treatment. The conditions for heat treatment vary depending on the type and viscosity of polyester. In order for the base film to have the specified refractive index ratio, density index, and intrinsic viscosity, the heat treatment can be carried out at a temperature higher than the melting point minus 100° C. and lower than the melting point minus 10° C., for 0.5 to 120 seconds, preferably 1 to 60 seconds. In such a manner that the film extends 0 to 10%, preferably 0 to 5%, based on the original length in the width direction. If the heat shrinkage is to be less than 4%, the heat treatment is carried out at a temperature higher than the melting point minus 50° C. and lower than the melting point minus 20° C.

There is described in the following a preferred process for producing the base film for the recording material of this invention from polyethylene-α,β-bis (2-chlorophenoxy)ethane-4,4'-dicarboxylate by successive biaxial orientation.

At first, the pellets of polyethylene-α,β-bis(2-chlorophenoxy)ethane-4,4'-dicarboxylate having an intrinsic viscosity of 0.3 to 1.4 are thoroughly dried under reduced pressure. The pellets are then fed to a known melt extruder and extruded from a slit die into an unoriented film. This unoriented film preferably have a density of 1.43 to 1.46, more suitably 1.43 to 1.45. The unoriented film having a density greater than the above specified limit is poor in the ability of biaxial orientation, particularly the second orientation. The film might break and become uneven in thickness.

The unoriented film is subjected to uniaxial orientation to form a film having such refractive indexes that the difference of values measured in long direction and width direction (long direction minus width direction) is 0.06 to 0.23, preferably 0.10 to 0.20, and having a density of 1.44 to 1.46, preferably 1.445 to 1.457. A uniaxially oriented film having a difference of refractive indexes smaller than the above-specified limit is poor in ability of the second orientation and is uneven in thickness. Moreover, such a film is susceptible to whitening and wrinkling. Conversely, a uniaxially oriented film having a difference of refractive index greater than the above specified limit is easy to be broken in the second orientation and is uneven in thickness. On the other hand, a uniaxially oriented film having a density smaller than the above-specified limit does not undergo the second orientation uniformly and becomes uneven in thickness. Conversely, a uniaxially oriented film having a density greater than the above-specified limit is easy to break in the second orientation and is uneven in thickness.

The uniaxially oriented film is then stretched in the direction perpendicular to the direction of the first orientation. The biaxially oriented film thus produced preferably have such refractive indices that the difference of values measured in long direction and width direction (long direction minus width direction) is −0.15 to 0.15, preferably −0.10 to 0.10. A biaxially oriented film having a difference of refractive indexes smaller or greater than the above-specified limit is susceptible to wrinkling in the subsequent heat treatment. Moreover, the magnetic tape resulting from it is poor in running performance.

The biaxially oriented film thus obtained is then subjected to heat treatment. The film after heat treatment preferably have a density of 1.45 to 1.49, more suitably 1.46 to 1.48. Also, it preferably have a refractive index of 1.520 to 1.565.

Following is a preferred process for producing a film having the above specified density and refractive index in the long direction, width direction, and thickness direction.

At first, the pellets of polyethylene-α,β-bis(2-chlorophenoxy)ethane-4,4'-dicarboxylate having an intrinsic viscosity of 0.3 to 1.4 are thoroughly vacuum dried. The pellets are then fed to a known melt extruder and extruded from a slit die into a sheet at 275° to 310° C., preferably 285° to 310° C. The sheet is cast onto a casting drum having a surface temperature of 20° to 80° C., whereby the sheet is cooled and solidified. Thus there is obtained an unoriented film. Electrostatic casting is effective in producing an unoriented film having a preferred density index.

The unoriented film is preheated to 70° to 125° C., preferably 80° to 120° C., and then stretched in the length direction at 80° to 130° C., preferably 90° to 125° C., at a rate of $10^3$ to $10^5$ %/min and at a draw ratio of 2.5 to 3.8 times, preferably 3 to 3.5 times. The uniaxially oriented film is then stretched in the width direction at 105° to 135° C., preferably 115° to 130° C., at a rate of $10^3$ to $10^5$ %/min and at a draw ratio of 2.8 to 4.3 times, preferably 3.0 to 3.7 times.

The biaxially oriented film is then relaxed at a ratio of 0 to 10%, preferably 0 to 5%, based on the original length in width direction. Under relaxation, the film is heated at 200° to 260° C., preferably 220° to 250° C. for 0.5 to 120 seconds, preferably 1.0 to 60 seconds. Thus, there is obtained the base film for the magnetic recording material of this invention.

The base film obtained as mentioned above is subsequently coated with a magnetic layer by the known methods. For instance, the magnetic layer may be formed by applying a solution containing powder of γ-$Fe_2O_3$, $Cr_2O_3$, or Co-doped iron oxide, or powder of Fe, Ni, or Co metal or alloys thereof, and a polymeric binder. The magnetic layer may also be formed directly on the base film by sputtering, depositing, or ion plating the desired metal. Before the formation of the magnetic layer, the base film may be subjected to the known corona discharge treatment in air, nitrogen, or carbon dioxide. In addition, the base film may be laminated or coated with a proper material to improve the adhesion, slipperiness, and surface smoothness.

The rollstock of the magnetic tape thus produced is then slit into a proper width (usually ½ inch).

The magnetic recording material of this invention has the above-mentioned structure; that is to say, it is composed of a base film made of a specific polyester that satisfies specific parameters and a magnetic layer formed on at least one side of the base film. Thus, it has the following outstanding features.

(1) The magnetic recording material is superior in running performance and electormagnetic conversion characteristics, even though it is made thinner than the conventional magnetic recording material. This makes it possible to miniaturize the recording apparatus, extend the recording time, and increase the recording density.

(2) The magnetic recording material is superior in adhesion between the base film and the magnetic layer. Thus, it is durable even after repeated use.

The magnetic recording material of this invention can be used for audio and video recording. It will exhibit its real value when used for video recording because of its superior running performance and electromagnetic conversion characteristics.

The definitions of the characteristic values used in this specification, and the methods for measuring and evaluating the magnetic recording material of this invention are described below.

(1) Refractive index

Determined by reading the value for the sodium D lines (wavelength: 589 nm) using an Abbe refractometer and a contacting liquid of methylene iodide or sulfur-containing methylene iodide solution, at 25° C. and 65% RH.

(2) Refractive index ratio in thickness direction

The refractive index (A) of the base film in thickness direction is measured as above. The refractive index (B) in thickness direction of the unoriented (amorphous) film prepared by quenching in water at 10° C. the base film immediately after melt pressing is measured as above. The ratio of A to B is the refractive index ratio in thickness direction.

(3) Density and density index

Density is measured by using a density (g/cubic cm) gradient tube containing carbon tetrachloride and n-heptane. The density of the biaxially oriented film is designated as $\rho$; and the density of the unoriented (amorphous) film prepared by quenching in water at 10° C. immediately after melt pressing is designated as $\rho_o$. The difference of $\rho - \rho_o$ is the density index. The measurement is carried out at 25° C.

(4) Intrinsic viscosity

Calculated from the relative viscosity measured at 25° C. in o-chlorophenol. The intrinsic viscosity can also be obtained using the following formula from the melt viscosity measured at 290° C. and shear rate of 200 sec$^{-1}$ using a Koka type flow tester.

$$[\eta] = 0.36 \, log\mu_a - 0.72 \, (\mu_a > 100)$$

where [η] is an intrinsic viscosity, and $\mu_a$ is a melt viscosity (poise) at 290° C. and a shear rate of 200 sec$^{-1}$.

(5) Young's modulus

Measured at 25° C. and 65% RH according to ASTM D-882 using an Instron type universal tester.

(6) Heat shrinkage

A test specimen measuring 10 mm wide and 250 mm long is cut out of the sample film, and two bench marks are scribed at an interval of about 200 mm. The distance between the bench marks is measured accurately. (A mm) The specimen is placed in a hot air oven at 150° C. for 30 minutes, with its end with a load of 3.0 g. Then, the distance between the bench marks is measured again. (B mm) The heat shrinkage (%) is calculated from $100 \times (A-B)/A$.

(7) Running performance of magnetic tape

The sample magnetic tape is set on a commercial household video tape recorder (helical scan type). The tape is started, run, and stopped repeatedly. The sample magnetic tape is evaluated in five ranks with respect to the following items. The sample tape having the total points from 25 to 20 is regarded as being good in running performance, and the sample tape having the total points from 19 to 5 is regarded as being poor in running performance.

(a) The tape does not fold at its edge.
(b) The tape does not stretch and curl.
(c) The tape does not tear.
(d) The tape does not squeak during running.
(e) The tape comes in close contact with the magnetic head.

(8) Electromagnetic conversion characteristics of magnetic tape

Using the above-mentioned video tape recorder, vertical line pictures are recorded at 20° C. and 60% RH. The tape is then run continuously at 60° C. for 100 hours. The tape is played back at 20° C. and 60% RH, and the shift (skew) of the picture from the reference line is measured. If the skew is less than 10 $\mu$sec, the tape is regarded as being good in electromagnetic conversion characteristics; and if the skew is in excess of 10 $\mu$sec, the tape is regarded as being poor in electromagnetic conversion characteristics.

(9) Stretchability

The film is regarded as being good in stretchability if the film does not break or breaks only once in the continuous biaxial orientation at a take-up speed of 50 m/min for 10 hours. The film is regarded as being poor in stretchability if the film breaks twice or more in the biaxial orientation.

(10) Thickness variation of film

The thickness of a 1-meter wide film (with the edges cut off) is measured continuously along the width direction. The thickness variation is calculated as follows:

$$(T_{max} - T_{min})/T_{ave} \times 100$$

where $T_{max}$ is the maximum thickness, $T_{min}$ is the minimum thickness, and $T_{ave}$ is the average thickness. If this value is less than 10%, the film is regarded as being good in thickness variation; and if this value is greater than 10%, the film is regarded as being poor in thickness variation.

(11) Glass transition point, cold crystallization point, and melting point

Measured using a differential scanning calorimeter (Model DSC II, made by Perkin-Elmer Co., Ltd.). The sample placed in the DSC is heated at a rate of 10° C./min until the apparent melting point is reached. The sample is melted at a temperature of the apparent melting point plus 30° C. for 5 minutes. The molten sample is quenched in liquid nitrogen, and the quenched sample is heated at a rate of 10° C./min until the glass transition point, cold crystallization temperature, and melting point are detected in the order listed.

The invention is now described with reference to the examples that follow.

EXAMPLE 1

Pellets of polyethylene-α,β-bis(2-chlorophenoxy)ethane-4,4'-dicarboxylate having an intrinsic viscosity of 0.55 were dried at 180° C. for 3 hours under vacuum (3 Torr). The pellets were mixed with 0.05 wt % of "Siloid" having an average particle diameter of 3 μm. The pellets were extruded at 300° C. by an extruder into a sheet and the sheet was cooled and solidified by a casting drum having a surface temperature of 20° C. by electrostatic casting. Thus there was obtained a substantially unoriented film having a thickness of 80 μm and a density of 1.43. This unoriented film was preheated to 100° C. and then stretched 3.6 times in the long direction at 120° C. at a drawing rate of 50,000 %/min using two pairs of rolls having different peripheral speeds. The refractive index of the resulting uniaxially oriented film was measured. The difference of the refractive index measured in long direction minus the refractive index measured in width direction was 0.16. The density of the film was 1.455. The uniaxially oriented film was then stretched 3.8 times in width direction at 120° C. using a tenter. The drawing rate was 5,000 %/min. The biaxially oriented film was heated at 230° C. for 30 seconds while keeping the length constant. Thus there was obtained a 6-μm thick film.

The above-mentioned film forming operation was carried out continuously for 10 hours. The film did not break during operation, and stretchability was good. The thickness variation was as little as 2%. The film forming operation was stable.

The parameters of the base film thus obtained are shown in Table 1 (Tape No. 1). Base films having different parameters as shown in Table 1 (Tape Nos. 2 to 9) were prepared by changing the stretching temperature and draw ratio.

One side of the base film thus obtained was coated with a magnetic layer of Co-Ni alloy in a thickness of 1000 Å by electron beam deposition method.

The roll-stock was slit into ½-inch magnetic tape using a shear cutter.

The characteristic properties the magnetic tape are shown in Table 1. It is to be noted that only the magnetic tape made from the base film of polyethylene-α,β-bis(2-chlorophenoxy)ethane-4,4'-dicarboxylate having the parameters within the specified values exhibited superior running performance and electromagnetic conversion characteristics even though the base film is as thin as 6 μm.

TABLE 1

| | | Base film | | | | | | Magnetic layer | | Characteristics of magnetic tape | | |
|---|---|---|---|---|---|---|---|---|---|---|---|---|
| | | | Parameters | | | | | | | | Electromagnetic | |
| Tape No. | Polymer | Thickness (μm) | Refractive index ratio* | Density index | Intrinsic viscosity | Refractive index* | Density (g cubic cm) | Type | Thickness (Å) | Running performance | conversion characteristics | Remarks |
| 1 | I | 6 | 0.960 | 0.035 | 0.5 | 1.540 | 1.465 | Co—Ni | 1000 | 24 (good) | 0 μsec (good) | Example |
| 2 | I | 6 | 0.970 | 0.030 | 0.5 | 1.557 | 1.460 | Co—Ni | 1000 | 23 (good) | 0 μsec (good) | Example |
| 3 | I | 6 | 0.956 | 0.040 | 0.5 | 1.534 | 1.470 | Co—Ni | 1000 | 24 (good) | 0 μsec (good) | Example |
| 4 | I | 6 | 0.980 | 0.035 | 0.5 | 1.573 | 1.465 | Co—Ni | 1000 | 6 (poor) | 15 μsec (poor) | Comp. Ex. |
| 5 | I | 6 | 0.930 | 0.035 | 0.5 | 1.493 | 1.465 | Co—Ni | 1000 | 10 (poor) | 5 μsec (good) | Comp. Ex. |
| 6 | I | 6 | 0.960 | 0.015 | 0.5 | 1.540 | 1.445 | Co—Ni | 1000 | 22 (good) | 20 μsec (poor) | Comp. Ex. |
| 7 | I | 6 | 0.960 | 0.082 | 0.5 | 1.540 | 1.512 | Co—Ni | 1000 | 11 (poor) | 4 μsec (good) | Comp. Ex. |
| 8 | I | 6 | 0.960 | 0.035 | 0.25 | 1.540 | 1.465 | Co—Ni | 1000 | 9 (poor) | 15 μsec (poor) | Comp. Ex. |
| 9 | I | 6 | 0.960 | 0.035 | 1.5 | 1.540 | 1.465 | Co—Ni | 1000 | 10 (poor) | 15 μsec (poor) | Comp. Ex. |

Note:
I: Polyethylene-α,β-bis(2-chlorophenoxy)ethane-4,4'-dicarboxylate
*measured in thickness direction

EXAMPLE 2

Pellets of polyethylene-α,β-bis(2-chlorophenoxy)ethane-4,4'-dicarboxylate having an intrinsic viscosity of 0.6 were dried and formed into an unoriented film having a thickness of 70 μm and a density of 1.43 in the same manner as in Example 1. This unoriented film was preheated to 120° C. and then simultaneously biaxially stretched 3 times in both directions at 120° C. using a biaxial tenter. The biaxially oriented film was heated at 240° C. for 15 seconds. Thus there was obtained a 8-μm thick film. The parameters of this base film are shown in Table 2 (Tape No. 10). This base film was coated with a magnetic layer as in Example 1 to make magnetic tape. The characteristic properties of the magnetic tape are shown in Table 2 (Tape No. 10). It is to be noted that the magnetic tape exhibited superior running performance and electromagnetic conversion characteristics even though the base film is as thin as 8 μm. Base films were prepared by changing the production conditions and the type of polymer, and magnetic tapes were prepared from these base polymers. The characteristic properties of these magnetic tapes are shown in Table 2 (Tape Nos. 11 to 14). It is to be noted that the magnetic tapes made of other polymers than that of this invention are poor in running performance and electromagnetic conversion characteristics even though the parameters are properly selected.

TABLE 2

| Tape No. | Polymer | Thickness (μm) | Refractive index ratio* | Refractive index* | Density index | Density (g/cubic cm) | Intrinsic viscosity | Young's modulus Long direction | Young's modulus Width direction | Heat shrinkage Long direction | Heat shrinkage Width direction | Running performance | Electromagnetic conversion characteristics | Remarks |
|---|---|---|---|---|---|---|---|---|---|---|---|---|---|---|
| 10 | I | 8 | 0.971 | 1.558 | 0.039 | 1.469 | 0.55 | 530 | 540 | 1.0 | 1.0 | 22 (good) | 0 μsec (good) | Example |
| 11 | I | 8 | 0.961 | 1.542 | 0.039 | 1.469 | 0.55 | 560 | 580 | 1.0 | 1.0 | 23 (good) | 0 μsec (good) | Example |
| 12 | I | 8 | 0.961 | 1.542 | 0.025 | 1.455 | 0.55 | 540 | 580 | 2.8 | 4.1 | 23 (good) | 5 μsec (good) | Example |
| 13** | II | 8 | 0.974 | 1.537 | 0.053 | 1.357 | 0.64 | 420 | 440 | 1.0 | 1.0 | 11 (poor) | 15 μsec (poor) | Comp. Ex. |
| 14** | III | 8 | 0.948 | 1.493 | 0.065 | 1.380 | 0.65 | 400 | 420 | 1.0 | 1.0 | 10 (poor) | 16 μsec (poor) | Comp. Ex. |

Note:
I: Polyethylene-α,β-bis(2-chlorophenoxy)ethane-4,4'-dicarboxylate
II: Polyethylene-α,β-bis(phenoxy)ethane-4,4'-dicarboxylate
III: Polyethylene terephthalate
*measured in thickness direction
**Experiments were carried out for possible parameters, although only some of them are shown here.

EXAMPLE 3

Pellets of polyethylene-α,β-bis(2-chlorophenoxy)ethane-4,4'-dicarboxylate having an intrinsic viscosity of 0.5 were dried at 180° C. for 3 hours under vacuum. The pellets were fed to a 35-mm extruder and extruded at 300° C. into a sheet. The sheet was cooled and solidified on a casting drum having a surface temperature of 20° C. by electrostatic casting. Thus there was obtained a substantially unoriented film having a thickness of 85 μm and a density of 1.43. This unoriented film was preheated to 110° C. and then stretched 3.0 times in the long direction at 120° C. at a drawing rate of 50,000 %/min. The uniaxially oriented film was then preheated to 110° C. and stretched 3.3 times in width direction at 120° C. using a tenter. The resulting biaxially oriented film was found to have a sum of Young's moduli (in long direction and width direction) of 1100 kg/mm². The biaxially oriented film was preheated to 130° C. and stretched 1.7 times in the long direction at 140° C. using two pairs of rolls running at different peripheral speeds. The drawing rate was 50,000 %/min. The oriented film was heated at 240° C. for 5 seconds in an oven while keeping the length constant. Thus there was obtained a 5-μm thick film.

This film was found to have a refractive index of 1.532 in thickness direction, a refractive index ratio of 0.955, a density of 1.47, a density index of 0.04, and an intrinsic viscosity of 0.47, which are all within the specified values of this invention. (Table 3, Tape No. 15). The sum and difference of refractive indexes of this film in long direction and width direction were 3.32 and 0.04, respectively, and the sum of Young's moduli in long direction and width direction was 2,400 kg/mm². The Young's modulus of this film (which underwent orientation twice) has 2.2 times as high as that of the simply biaxially oriented film (Table 3, Tape No. 17). This film was also found to have a heat shrinkage of 2.5% in long direction and 1.0% in width direction at 150° C.

The base film was coated with a magnetic layer as in Example 1 to prepare a magnetic tape. The characteristic properties of this magnetic tape are shown in Table 2 (Tape No. 15). It is to be noted that only the magnetic tape exhibited superior running performance and electromagnetic conversion characteristics even though the base film is as thin as 5 μm. The characteristic properties of magnetic tapes made from base films having different parameters are shown in Table 3, Tape Nos. 16 to 21. It is to be noted that the superior running performance and electromagnetic conversion characteristics are accomplished only when the base film and polymer have the parameters within the specified values of this invention.

TABLE 3

| Tape No. | Polymer | Draw ratio α | Draw ratio β | Draw ratio γ | Draw ratio δ | Thickness (μm) | Refractive index ratio* | Density index | Intrinsic viscosity | Sum of refractive indexes MD + TD | Difference of refractive indexes MD − TD | Sum of Young's moduli MD + TD | Running performance | Electromagnetic conversion characteristics | Remarks |
|---|---|---|---|---|---|---|---|---|---|---|---|---|---|---|---|
| 15 | I | 3.0 | 3.3 | 1.7 | 1.0 | 5 | 0.955 | 0.04 | 0.47 | 3.320 | 0.04 | 2400 | 25 (good) | 0 μsec (good) | Example |
| 16 | I | 3.6 | 4.0 | 1.7 | 1.0 | 5 | 0.950 | 0.04 | 0.47 | 3.330 | 0.04 | 2850 | 22 (good) | 2 μsec (good) | Example |
| 17 | I | 3.0 | 3.3 | 1.0 | 1.0 | 7 | 0.962 | 0.04 | 0.47 | 3.306 | −0.01 | 1100 | 23 (good) | 0 μsec (good) | Example |
| 18 | I | 3.0 | 3.0 | 1.5 | 1.5 | 6 | 0.956 | 0.04 | 0.47 | 3.328 | −0.005 | 1350 | 23 (good) | 2 μsec (good) | Example |
| 19 | I | 2.8 | 2.8 | 2.0 | 1.0 | 7 | 0.960 | 0.04 | 0.47 | 3.310 | 0.16 | 1500 | 20 (good) | 2 μsec (good) | Example |
| 20** | II | 3.0 | 3.3 | 1.7 | 1.0 | 7 | 0.972 | 0.055 | 0.64 | 3.313 | 0.02 | 1100 | 15 (poor) | 15 μsec (poor) | Comp. Ex. |
| 21** | III | 3.3 | 3.6 | 1.7 | 1.0 | 7 | 0.945 | 0.067 | 0.65 | 3.316 | 0.04 | 1000 | 15 | 18 μsec | Comp. |

TABLE 3-continued

| | Base film | | | | | | | | | | Characteristics of magnetic tape | | |
|---|---|---|---|---|---|---|---|---|---|---|---|---|---|
| | | | | | | Parameters | | | | | | | |
| Tape No. | Polymer | Draw ratio | | | | Thickness (μm) | Refractive index ratio* | Density index | Intrinsic viscosity | Sum of refractive indexes MD + TD | Difference of refractive indexes MD − TD | Sum of Young's moduli MD + TD | Running performance | Electromagnetic conversion characteristics | Remarks |
| | | α | β | γ | δ | | | | | | | | | | |
| | | | | | | | | | | | | | (poor) | (poor) | Ex. |

Note:
I: Polyethylene-α,β-bis(2-chlorophenoxy)ethane-4,4'-dicarboxylate
II: Polyethylene-α,β-bis(phenoxy)ethane-4,4'-dicarboxylate
III: Polyethylene terephthalate
Draw ratio: α first stretching in long direction; β first stretching in width direction; γ second stretching in long direction; δ second stretching in width direction.
**Experiments were carried out for possible parameters, although only some of them are shown here.
*Measured in thickness direction.

We claim:

1. A magnetic recording material which comprises a film of a polyester and a magnetic layer formed on at least one side of said film, said polyester comprising more than 85 mol % of a main repeating unit represented by the formula:

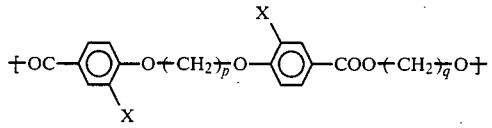

where
X is a halogen atom selected from the group consisting of fluorine, chlorine and bormine; p is an integer of 2 to 6, and q is an integer of 2 to 4,
and having an intrinsic viscosity of 0.3 to 1.4, and said film having a refractive index ratio of 0.935 to 0.975 in the thickness direction and a density index of 0.02 to 0.08.

2. A magnetic recording material of claim 1, wherein the polyester comprises more than 90 mol % of the main repeating unit.

3. A magnetic recording material of claim 1, wherein the polyester comprises more than 95 mol % of the main repeating unit.

4. A magnetic recording material of claim 1, wherein p and are both 2.

5. A magnetic recording material of claim 1, wherein X is chlorine.

6. A magnetic recording material of claim 1, wherein the main repeating unit is ethylene-α,β-bis(2-chlorophenoxy)ethane-4,4'-dicarboxylate.

7. A magnetic recording material of claim 1, wherein the polyester substantially comprises polyethylene-α,β-bis(2-chlorophenoxy)ethane-4,4'-dicarboxylate.

8. A magnetic recording material of claim 1, wherein the polyester has an intrinsic viscosity of 0.3 to 1.0.

9. A magnetic recording material of claim 1, wherein said base film has a refractive index ratio of 0.940 to 0.970 in the thickness direction.

10. A magnetic recording material of claim 1, wherein said base film has a density index of 0.02 to 0.05.

11. A magnetic recording material of claim 1, wherein the base film has a refractive index of 1.520 to 1.565 in the thickness direction and a density of 1.45 to 1.49.

12. A magnetic recording material of claim 1, wherein the base film has a refractive index of 1.530 to 1.560 in the thickness direction and a density of 1.46 to 1.48.

13. A magnetic recording material of claim 1, wherein the base film has a Young's modulus of 550 to 2000 kg/mm$^2$ in at least one direction and a heat shrinkage of 0 to 4% at 150° C. in said direction.

14. A magnetic recording material of claim 1, wherein the base film has a sum of the refractive indices in length and width directions is 3.305 to 3.420, and a difference of the refractive indices between length and width directions is −0.15 to 0.15, and a sum of the Young's moduli in length and width directions is 1500 to 2800 kg/mm$^2$.

15. A magnetic recording material of claim 1, wherein the thickness of the base film is 2 to 12 μm.

16. A magnetic recording material of claim 1, wherein the magnetic layer has a thickness of 0.05 to 5 μm.

17. A magnetic recording material of claim 1, wherein the magnetic layer is a thin film consisting essentially of ferromagnetic metal.

18. A magnetic recording material of claim 17, wherein the ferromagnetic metal of the magnetic layer is a member selected from the group consisting of γ-Fe$_2$O$_3$, Fe$_3$O$_4$, Co-doped iron oxide, Fe, Co, Ni, Mn and an alloy containing at least one of them.

* * * * *